UNITED STATES PATENT OFFICE.

JEAN IGNAZ LEIST, OF BROOKLYN, NEW YORK.

COMPOSITION FOR REPELLING INSECTS.

1,375,220. Specification of Letters Patent. Patented Apr. 19, 1921.

No Drawing. Application filed September 13, 1919. Serial No. 323,642.

*To all whom it may concern:*

Be it known that I, JEAN IGNAZ LEIST, a citizen of the Republic of Germany, residing in the borough of Brooklyn, county of Kings, city and State of New York, have invented certain new and useful Improvements in Compositions for Repelling Insects, of which the following is a full, clear, and concise description.

The object of my invention is to provide a non-poisonous composition of matter which may be economically manufactured and which will prove efficacious in repelling insects, such as mosquitoes and the like from places of human habitation.

A further object of my invention is to produce a new and useful composition of matter for the aforesaid purposes, which may be in the form of a powder, which is adapted to be applied to the human body, whereby the user thereof may be protected against insect bites, the characteristics of the composition being such that the odor is not offensive to humans, but is obnoxious to insects and serves to repel or keep them from the person using the same.

My invention also contemplates a composition of matter possessing the aforesaid advantages and characteristics, which is substantially colorless when applied to the human flesh, so that it may be freely used upon exposed portions of the person without attracting notice or causing any inconvenience.

I shall now proceeed to set forth the constituents of my new and useful composition of matter, and the manner in which it may be employed, and the beneficial results attained through its use.

Broadly, my improved composition of matter consists of carbonated magnesium and thymol. These two ingredients are used preferably in powdered form in the following proportions:

Magnesium carbonate_____ $83\frac{1}{2}\%$
Thymol _____ $16\frac{1}{2}\%$

A complete mixture of the two components is effected by placing the proper proportions of the magnesium carbonate and the thymol in a drum or tumbler which is actuated for a period of, say, one hour. The friction created by the tumbling of the mass within the drum raises the temperature of the thymol to the melting point, the thymol dissolving into the magnesium carbonate, so that the resulting compound possesses all of the characteristics inherent in the magnesium carbonate plus those of the thymol as a repellant agent.

In use, the composition of matter is applied to the person similarly to talcum and like powders, and adheres to the flesh for a considerable period of time, unless it is washed off. I have found from practical experiments in mosquito infested localities that the thymol and magnesium carbonate must be mixed in the proportions herein given to obtain satisfactory results. In those instances where I employed a smaller percentage of the thymol, I found that the composition was not effective in repelling the insects, while by increasing the percentage of thymol above $16\frac{2}{3}\%$ of the total, the odor was more or less offensive, although the efficiency of the product for repelling insects was in no way lessened. Therefore, to obtain a satisfactory composition to attain the results to which my invention is directed, it is necessary to use the ingredients in substantially the proportions specified.

In those instances where it is desired to use the composition in homes and the like, it may be employed in the powdered or pulverized form by placing it in suitable vessels, or, if desired, the magnesium and thymol, when properly mixed, may be combined with a hardening agent, such as plaster of Paris, for instance, the whole being mixed with water to render it plastic, after which it may be permitted to harden. This will not destroy the insect-repellent properties of the thymol, and forms a convenient method whereby the composition may be handled for distribution and sale and by the members of the household wherein it is used.

While I have specifically described my invention with reference to its advantages in repelling insects, it is evident that it may also be employed for other purposes in meeting the requirements of sanitation, both about the person and the household, and in repelling vermin and rodents, all of which uses, and any others to which my invention may be put, I reserve as coming within the spirit and scope of my invention. Furthermore, thymol, as is well known, is an antiseptic, and my composition of matter may therefore be used to advantage as an antiseptic agent.

I claim:

1. The herein-described composition of matter consisting of a major portion of magnesium carbonate and a minor portion of thymol.

2. The herein-described composition of matter consisting of $83\frac{1}{2}\%$ of magnesium carbonate and $16\frac{1}{2}\%$ of thymol.

JEAN IGNAZ LEIST.